(12) United States Patent
Stroppiana

(10) Patent No.: US 7,682,684 B2
(45) Date of Patent: Mar. 23, 2010

(54) COVERING MATERIAL, FOR INSTANCE FOR FLOORINGS

(75) Inventor: Fernando Stroppiana, Grinzane Cavour (IT)

(73) Assignee: Mondo S.p.A, Alba Frazione Gallo (IT)

( * ) Notice: Subject to any disclaimer, the term of this patent is extended or adjusted under 35 U.S.C. 154(b) by 1160 days.

(21) Appl. No.: 11/282,499

(22) Filed: Nov. 18, 2005

(65) Prior Publication Data

US 2006/0105147 A1 May 18, 2006

(30) Foreign Application Priority Data

Nov. 18, 2004 (EP) ................... 04425860

(51) Int. Cl.
*B32B 7/02* (2006.01)
*B32B 3/30* (2006.01)

(52) U.S. Cl. .................. 428/141; 428/172; 428/212; 428/218

(58) Field of Classification Search .......... 428/170, 428/172, 218, 515, 212; 5/417, 420; 52/403.1
See application file for complete search history.

(56) References Cited

U.S. PATENT DOCUMENTS

| | | | | |
|---|---|---|---|---|
| 3,776,752 A | * | 12/1973 | Craven | 427/273 |
| 4,130,535 A | | 12/1978 | Coran et al. | 260/33.6 AQ |
| 4,311,628 A | | 1/1982 | Abdou-Sabet et al. | 260/33.6 AQ |
| 4,324,824 A | * | 4/1982 | Narens et al. | 428/92 |
| 4,994,112 A | * | 2/1991 | Majewicz et al. | 106/172.1 |
| 5,059,474 A | * | 10/1991 | Yoshida | 428/174 |
| 5,234,738 A | * | 8/1993 | Wolf | 428/120 |
| 5,889,119 A | * | 3/1999 | Coran et al. | 525/232 |
| 5,997,782 A | | 12/1999 | Kopf et al. | 264/45.8 |
| 6,224,804 B1 | | 5/2001 | Schwonke et al. | |

(Continued)

FOREIGN PATENT DOCUMENTS

EP   0 385 053 A2   9/1990

(Continued)

OTHER PUBLICATIONS

"DOW Low Density Polyethylene (LDPE) Resins," http://plastics.dow.com/plastics/ap/prod/polyethylene/ldpe.htm, retreived Aug. 27, 2007, 2 pages.

(Continued)

*Primary Examiner*—David R Sample
*Assistant Examiner*—Nathan E. Comstock
(74) *Attorney, Agent, or Firm*—Seed IP Law Group PLLC

(57) ABSTRACT

A stratified-structure laminar covering material, which can be used for example as a flooring for sports facilities, comprises an outermost layer, a bottom layer, and an intermediate layer set between the outermost layer and the bottom layer. The aforesaid layers comprise a matrix constituted by a mixture of polyolefin and thermoplastic elastomer, the matrix being substantially identical for all three layers. The matrix of the outermost layer is substantially free from fillers and has a first value of density. The bottom layer contains fillers so as to have a second value of density greater than said first value of density, and the intermediate layer contains fillers so as to have a third value of density intermediate between the first value of density of the outermost layer and the second value of density of the bottom layer.

27 Claims, 3 Drawing Sheets

U.S. PATENT DOCUMENTS

| | | | |
|---|---|---|---|
| 6,251,321 B1 * | 6/2001 | Kuhl et al. | 264/73 |
| 2001/0005542 A1 | 6/2001 | Graab et al. | |
| 2004/0161995 A1 * | 8/2004 | Takeda et al. | 442/381 |
| 2004/0258874 A1 * | 12/2004 | Desai | 428/95 |

FOREIGN PATENT DOCUMENTS

| | | | |
|---|---|---|---|
| EP | 0 874 105 A1 | 10/1998 | |
| EP | 0 913 524 A1 | 5/1999 | |
| EP | 1 020 282 A2 | 7/2000 | |
| EP | 1426179 A1 * | 6/2004 | |
| EP | 0968804 B1 | 9/2004 | |
| EP | 1510546 A1 | 3/2005 | |

OTHER PUBLICATIONS

"Low Density Polyethylene (LDPE) Properties and Technical Information—Dynalab Corp," http://www.dynalabcorp.com/technical_info_id_polyethylene.asp, retrieved Aug. 27, 2007, 2 pages.

* cited by examiner

COVERING MATERIAL, FOR INSTANCE FOR FLOORINGS

BACKGROUND OF THE INVENTION

1. Field of the Invention

The present invention relates to covering materials, such as for example the laminar covering materials that can be used in the building and furnishing sectors, in particular for the construction of floorings.

2. Description of the Related Art

The wide variety of covering materials of this type currently available fall into three basic categories.

One category that perhaps dates furthest back in time corresponds to the covering material commonly referred to as linoleum. The corresponding production technique basically envisages adding to linseed oil filling materials, such as wood flour and cork flour, mineral fillers, pigments and other additives so as to obtain a so-called linoleum paste. This paste then undergoes rolling in order to form sheets, which in turn undergo a so-called "curing" step, which lasts some dozens of days and is basically aimed at achieving a consolidation of the sheet of linoleum sufficient to enable its further handling and treatment (for example, so as to enable winding thereof into rolls for subsequent laying).

Notwithstanding its long existence over time, this category occupies only quite a modest share of the market both on account of the disadvantages linked to the intrinsic lengthiness of the process of curing and because, in the steps subsequent to laying of the flooring, linoleum tends to release into the environment an intense and characteristic odor linked to the presence of linseed oil.

A very substantial slice of the market of coatings and floorings is represented by synthetic plastic materials. One of the most widely used materials for making these coatings, which is able to present a contained cost, is represented by polyvinyl chloride (PVC). Irrespective of any other consideration, these floorings, and in particular PVC-based ones, tend to be viewed with less favor on account of the substances (for example, compounds of chlorine and plasticizing agents) that can be released by the coating, also on account of their disagreeable smell.

In the course of the last few years, rubber-based floorings have met with particular favor. These floorings are able to combine excellent characteristics of use (for example, as regards resistance to mechanical stresses, to aggressive chemical agents, and to burns) and as regards the possibility of obtaining coatings and floorings that are particularly pleasant from the aesthetic standpoint (for example, with general marbled effects or effects of dispersion of granules of different colors). Examples of this prior art are provided by EP-A-0 968 804 and EP-A-1 020 282.

Over the years there has been no lack of attempts to merge the characteristic elements of the various techniques of production considered previously. For example, in EP-A-0 385 053 there are described coatings of linoleum with the addition of rubber, the main purpose being to enable exploitation of the process of vulcanizing of the rubber in order to make available a coating of linoleum that can be handled and transferred to the site of laying in far shorter times than those characteristically required for curing linoleum floorings of a traditional type.

Even though the solutions described in the known art, have proven to be satisfactory and advantageous to use, there still exists the possibility of achieving further improvements above all as regards the possibility of further improving the mechanical characteristics of the covering material, the resistance to external stresses (particularly as regards the stresses due to treading), and the possibility of widening even more the choice of the chromatic ranges for making the coating.

BRIEF SUMMARY OF THE INVENTION

In one embodiment, the present invention provides a covering material which can be used, for example, as flooring and is able to combine the majority of the qualities of the covering materials of a traditional type, without at the same time sharing their drawbacks.

In particular, the present invention describes a covering material having the characteristics referred to specifically in the ensuing claims. The claims form an integral part of the disclosure of the invention provided herein.

The covering material described in what follows is able to offer, as regards the characteristics of resistance to the environment (mechanical stresses and attack by chemical agents, resistance to burns, etc.), altogether equivalent characteristics, and at least in some cases decidedly superior ones, both as compared to coatings made of plastic material and as compared to coatings made of rubber (and consequently, from this standpoint, a performance amply superior to that of coatings made of linoleum).

As regards the aesthetic characteristics, the method described herein enables production of covering materials with chromatic features chosen within a practically infinite range, with a very wide range of choices as regards "marble" or "granite" effects. Alongside this, results are obtained that, at least on the basis of the experiments so far conducted by the present applicant, are in many cases qualitatively superior to the results that can commonly be achieved in the case of coatings made of plastic material and rubber material.

BRIEF DESCRIPTION OF THE SEVERAL VIEWS OF THE DRAWING(S)

The invention will now be described, purely by way of non-limiting example, with reference to the annexed plate of drawings, in which.

DETAILED DESCRIPTION OF THE INVENTION

Figure 1:
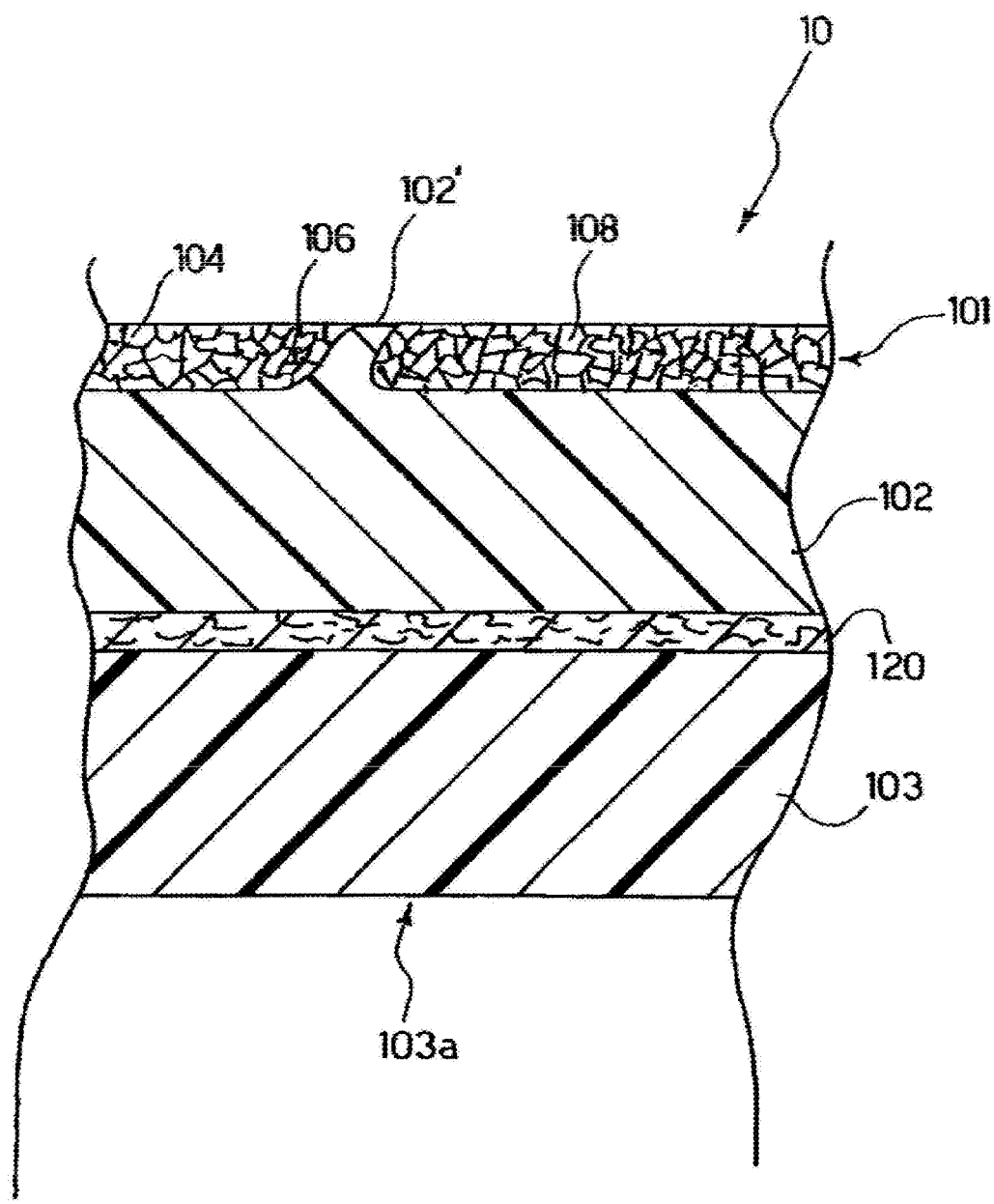
FIG. 1 is an ideal cross section of a covering material of the type described herein.

U.S. Patent Publication No. 2005/0065236, in the name of Mondo, S.p.A., the assignee of the instant application, describes a laminar covering material comprising a polyolefin matrix having a first coloring and a phase of particulate elastomer material dispersed in said polyolefin matrix, the particulate phase comprising particles of at least one second coloring that contrasts with the first coloring. In a preferred way, the elastomer material is vulcanized elastomer material, and the aforesaid phase of elastomer material comprises particles of elastomer material with at least two different colorings that contrast with the coloring of the polyolefin matrix.

In a particularly preferred way, the material described in said prior document envisages that the particles of the phase of elastomer material will present, at least in a proportion that usually constitutes a substantial part of the phase of elastomer material, dimensions between 100 μm and 500 μm. The polyolefin is preferentially chosen in the group consisting of polyethylene, polypropylene and mixtures thereof, whilst the elastomer is chosen in the group consisting of natural rubber (NR), SBR, EPM, EPDM, IR, BR, CR and NBR, as well as mixtures thereof.

U.S. Patent Publication No. 2005/0065236 hence envisages addition of a dispersed phase of particulate material (the so-called "dust") of vulcanized rubber to a polyolefin matrix (for example polyethylene).

Materials based upon this combination are in themselves well known in the art, as witnessed by documents such as U.S. Pat. Nos. 4,130,535 and 4,311,628. The solutions described in these prior documents aim at obtaining so-called "thermoplastic elastomers", i.e., materials that can be used for technological applications, for example in the automotive sector. The materials obtained according to these documents of the known art are suitable for applications typical of elastomers, such as rubber (for example, weatherproofing for windows of motor vehicles, production of hoses for the conveyance of fluids even at high temperature and pressure, etc.). For this purpose, these known solutions emphasize the importance linked to the fact that the particles of elastomer (rubber) constitute a finely dispersed phase within the polyolefin matrix, with a grain size typical of particles of elastomer of markedly submillimetric dimensions. For example, in U.S. Pat. No. 4,130,535, typical dimensions of the particles of rubber constituting the dispersed elastomer phase are indicated in the region of 50 µm.

In the specific case, the arrangement described herein is designed to form a coating which can be used, for example, as flooring. In this regard, it will likewise be appreciated that each of the operating steps described in what follows, as well as the equipment that enables its implementation—taken in themselves—is amply known in the art. This fact thus renders it superfluous to provide herein a detailed description of said operating steps and of the corresponding equipment.

In particular, one embodiment provides a coating with an appearance approximately resembling that of a marble with a fine granular structure or, in a perhaps more precise way, approximately resembling the appearance of granite, all this, of course, with practically infinite possibility of varying the chromatic characteristics of the coating.

As may be better appreciated in the diagram of FIG. 1, the coating described herein, designated as a whole by 10, has a structure that is as a whole stratified, comprising three layers designated, respectively, by 101, 102 and 103, with the possible presence of a further layer 120, usually set between the layers 102 and 103.

The layer designated by 101 constitutes the outermost or uppermost layer of the coating, namely, the layer that will be exposed on the outside, thus being visible.

The layer designated by 102 is an intermediate layer, whilst the layer designated by 103 is a bottom layer or backing, namely, the layer used for applying the coating 10.

For example, in the case of a coating 10 made in the form of a flooring, the layer 103 constitutes the bottom or base layer of the flooring, which will be laid on the substrate to be coated (for example a cement course).

The representation with a dashed line in the bottom part of FIG. 1 intends to highlight the fact that the outer surface of the bottom layer 103 can present both a pattern that is as a whole plane and a grooving constituted by formations or ribbings or alveolar formations constituting feet for supporting the flooring. The fact of providing, according to said modalities, the bottom layer of a flooring is well known in the art, for example for applications to floorings for use in sports facilities, as is witnessed, for example, by EP-A-0 874 105 and EP-A-0 913 524.

The layer 120 functions as stabilization layer and typically consists of glass fiber and/or polyester fiber. The choice of setting the layer 120 between the layers 102 and 103 is preferred, but not imperative: for example, the stabilization layer 120 could also be set between the layer 101 and the layer 102.

An important characteristic of the solution described herein is represented by the fact that the layers 101, 102 and 103 have a base of a mixture of polyolefin material and thermoplastic elastomer (TPE) that is substantially of the same nature for all three layers 101, 102, 103.

The polyolefin material in question is typically chosen in the group consisting of polyethylene, polypropylene and/or mixtures and/or copolymers thereof. Preferably, said material is substantially polyethylene, and in a particularly preferred way, low-density polyethylene.

The thermoplastic elastomer is typically chosen in the group made up of TPS, i.e., thermoplastic elastomers of styrenic origin, and mixtures thereof. Preferably, said thermoplastic elastomer of styrenic origin is substantially poly(styrene-butadiene-styrene) (SBS).

Defining the layers in question as having a base of a mixture of polyolefin material/thermoplastic elastomer that is substantially of the same nature for all three layers is equivalent to saying that said mixture is constituted by the same materials (for example, polyethylene and SBS) for all three layers 101, 102 and 103, at the same time envisaging the possibility of differentiating the three layers 101, 102 and 103 in relation, for example, to the quantity of fillers present in the polyolefin/TPE matrix.

In the case in point, the base coloring of all three layers 101, 102 and 103 can be substantially the same. For example, all three layers 101, 102 and 103 can present a basic coloring of green, or red, or blue, as a whole identical for all three layers. The stabilization layer 120, if present, does not usually have a particular chromatic connotation, being typically made up, as has already been said, of glass fiber and/or polyester fiber.

The fact that all three layers 101, 102 and 103 have a base of polyolefin/TPE mixture is bound to favor the intimate adhesion and cohesiveness of the three layers 101, 102 and 103. This latter characteristic confers particular features of stability on the coating 10 as a whole, above all with reference to the possible application as a flooring for sports facilities. In this connection, it will be appreciated that the stabilization layer, if present and independently of where it is set, is chosen with a sufficiently coarse mesh and a sufficiently small mass per unit area (for example 25-50 g/m$^2$) to cause the stabilization layer itself to be in effect incorporated in the polyolefin/TPE matrix of the adjacent layers.

In the currently preferred embodiment of the invention, the layers 102 and 103 differ from one another prevalently on account of the different level of filling present therein (typically mineral filler, such as calcium carbonate or other fillers currently used in the sector of coatings/floorings).

The bottom layer 103 in fact usually consists of a polyolefin/TPE matrix containing fillers so as to have a density equal to or greater than 1.6 g/cm$^3$. A density of this type confers on the layer 103 (and on the coating 10 as a whole) characteristics of mechanical stability and firm anchorage. Typically, the thickness of the layer 103 accounts for approximately 40%-60% of the overall thickness of the coating 10. Excluded from said given amount is the height of the formations 105 (if present).

Furthermore, when at the end of the process of fabrication described in greater detail in what follows the bottom or outer face of the bottom layer 103 is subjected to a treatment of grinding, the presence of a high level of filling means that the aforesaid outer face 103a (the bottom one in the representation of FIG. 1) presents in any case a level of roughness or microgranularity considered particularly suited for obtaining a firm anchorage (usually obtained using adhesive) of the coating 10 to the substrate on which it is applied.

Albeit with a formulation substantially identical to the polyolefin/TPE matrix, the intermediate layer 102 has a lower level of filling than that of the base layer 103; typical values of the density of the intermediate layer 102 are 1.3-1.4 g/cm$^3$. The reasons for this choice will emerge more clearly from what follows.

The thickness of the layer 102 also accounts for approximately 40%-60% of the overall thickness of the coating 10, whilst (as may be seen from the cross section of FIG. 1) the outermost layer 101 contributes to a minor extent to said overall thickness.

The overall aesthetic effect of the coating 10 results from the presence of the top or outermost layer 101. The latter is obtained preferentially starting from granules 104, 106, 108 of a polyolefin/TPE mixture substantially similar to the mixture constituting the matrix of the layers 102 and 103, with the difference represented by the fact that, in the case of the outermost layer 101, said matrix is substantially free from fillers i.e., it contains only a small amount of fillers (for example, on account of the presence of pigmenting fillers) so as to have a density in the region of 1-1.1 g/cm$^3$.

In what follows it will be assumed—purely by way of example—that the layer 101 consists of granules 104, 106 and 108 of three different colorings, such as, for example, dark green, medium green or grayish-green, and light green.

The individual granule can have, instead, a single coloring or different colorings, given for example by the presence, within the granule, of portions having different colorings.

Of course, the fact that the example illustrated herein envisages the use of granules 104, 106, 108 of three different colors must not be interpreted as in any sense limiting the possibility of using granular materials in a smaller number (for example, it is possible to envisage the presence of just one type of granular material) or a larger number (for example, four or more) as compared to the example presented herein.

The typical dimensions of the particles/granules 104, 106, 108 are in a range of from a fraction of a millimeter to some millimeters, if it is also necessary to take into account the fact that said dimensions, as perceived by the observer, usually tend to increase as a result of the process of fabrication described in what follows, which tends to a certain extent to compress/flatten out said granules. The experiments conducted by the present applicant show that also particles of smaller dimensions can achieve a certain effect in the context of the overall chromatic result, creating, in the coating obtained as final result, portions of material having a coloring that is intermediate between the colorings of the various starting components.

From FIG. 1 it will be appreciated in particular that, whereas between the intermediate layer 102 and bottom layer 103 there is normally present—even in the presence of the stabilization layer 120—an interface of intimate connection with a substantially plane pattern, the intermediate layer 102 and the top layer 101 can instead interpenetrate until the intermediate layer 102 can be made to present, at a local level, small offshoots or tongues that extend as far as the outermost surface of the coating, as designated as a whole by 102' in FIG. 1.

The fact of making the outermost layer 101 with a particulate material (granules 104, 106 and 108) substantially not containing fillers and hence substantially free from fillers i.e., containing only a small amount of fillers, with the values of density indicated herein, has surprisingly and unexpectedly proven advantageous as regards the possibility of preventing the appearance of directional phenomena upon visual observation of the top layer 101.

Figure 2:
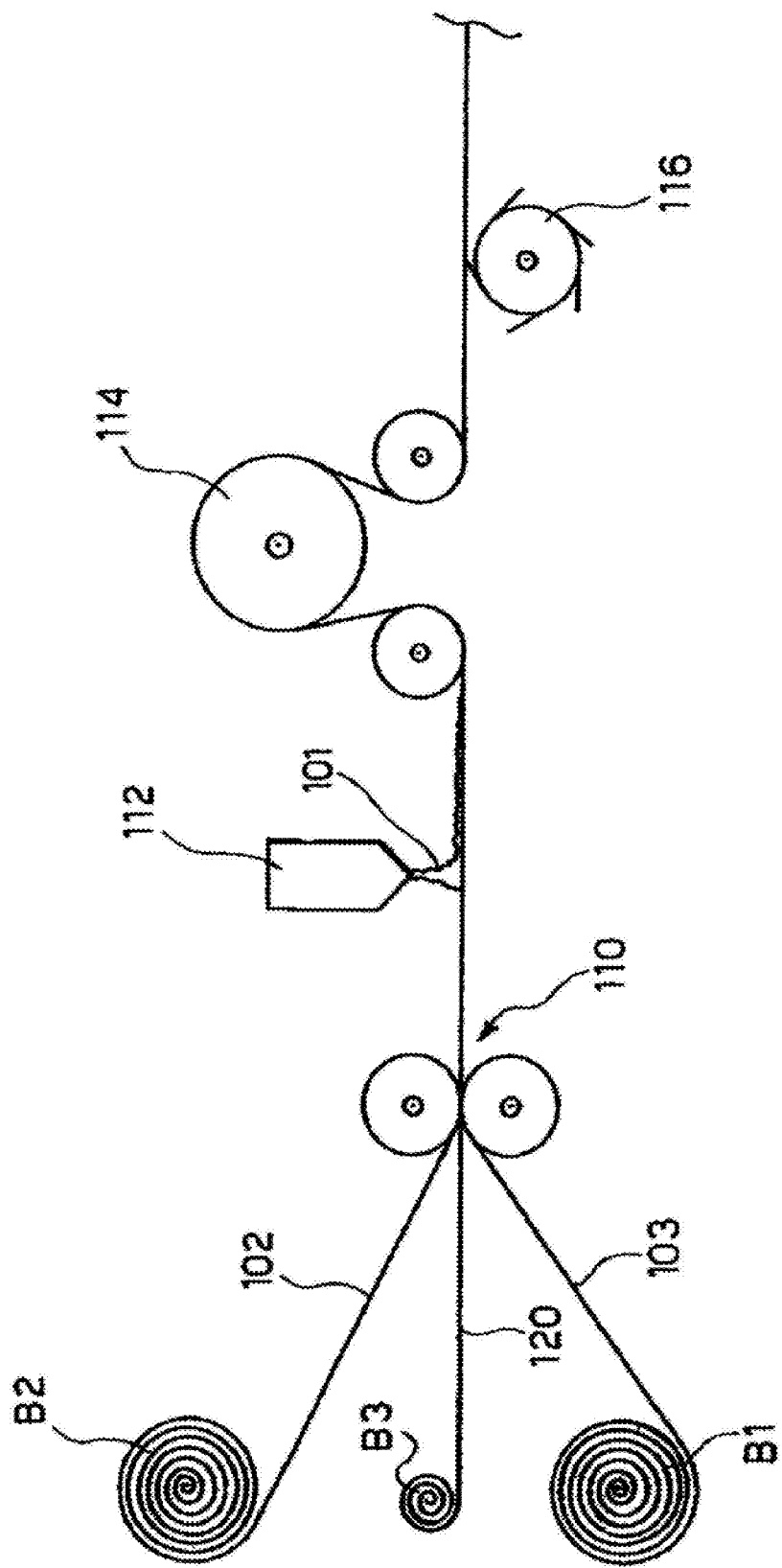
FIG. 2 is a schematic illustration of the modalities of production of a coating of the type described herein.

The importance of this aspect can be more fully appreciated with reference to the process currently preferred for making the coating 10 schematically represented in FIG. 2.

In the left-hand part of FIG. 2, the layers 103 and 102 may be seen, which unwind from respective sources of supply, typically in the form of reels designated by B1 and B2. The reference B3 designates then a further reel, from which the stabilization layer 120 is wound off, which will be set in an intermediate position between the layers 102 and 103.

The reference number 110 is a schematic representation of a coupling station, where the strips of the layers 102 and 103 (and 120) are set on top of one another, without for the moment achieving a more intimate connection, so as to cause them to advance in a coordinated way towards a station 112, where there is then carried out, according to a technique of "seeding", which is widely used in the fabrication of marbled floorings, the operation of depositing the material that is to form the outermost layer 101, namely, the granules 104, 106 and 108.

In a possible variant embodiment of the invention, the layer 101 can also be supplied in the form of a strip or ribbon that is wound off a respective reel and is coupled (juxtaposed) with the strips of the layers 102 and 103 (and 120) in the station 110.

The set of the elements or parts that are to form the coating 10 is then sent on towards equipment for the simultaneous application of heat and pressure, designated as whole by 114.

The use of presses of this type is well known and widely employed in the techniques of fabrication of coatings and floorings made of plastic and rubber material.

Whatever the specific solution of the system used, the simultaneous application of heat and pressure to the set of parts or components described leads to the formation of a coating structure such as the structure indicated as a whole by 10 in FIG. 1.

Said coating structure can then be sent on for subsequent processes.

Figure 3:
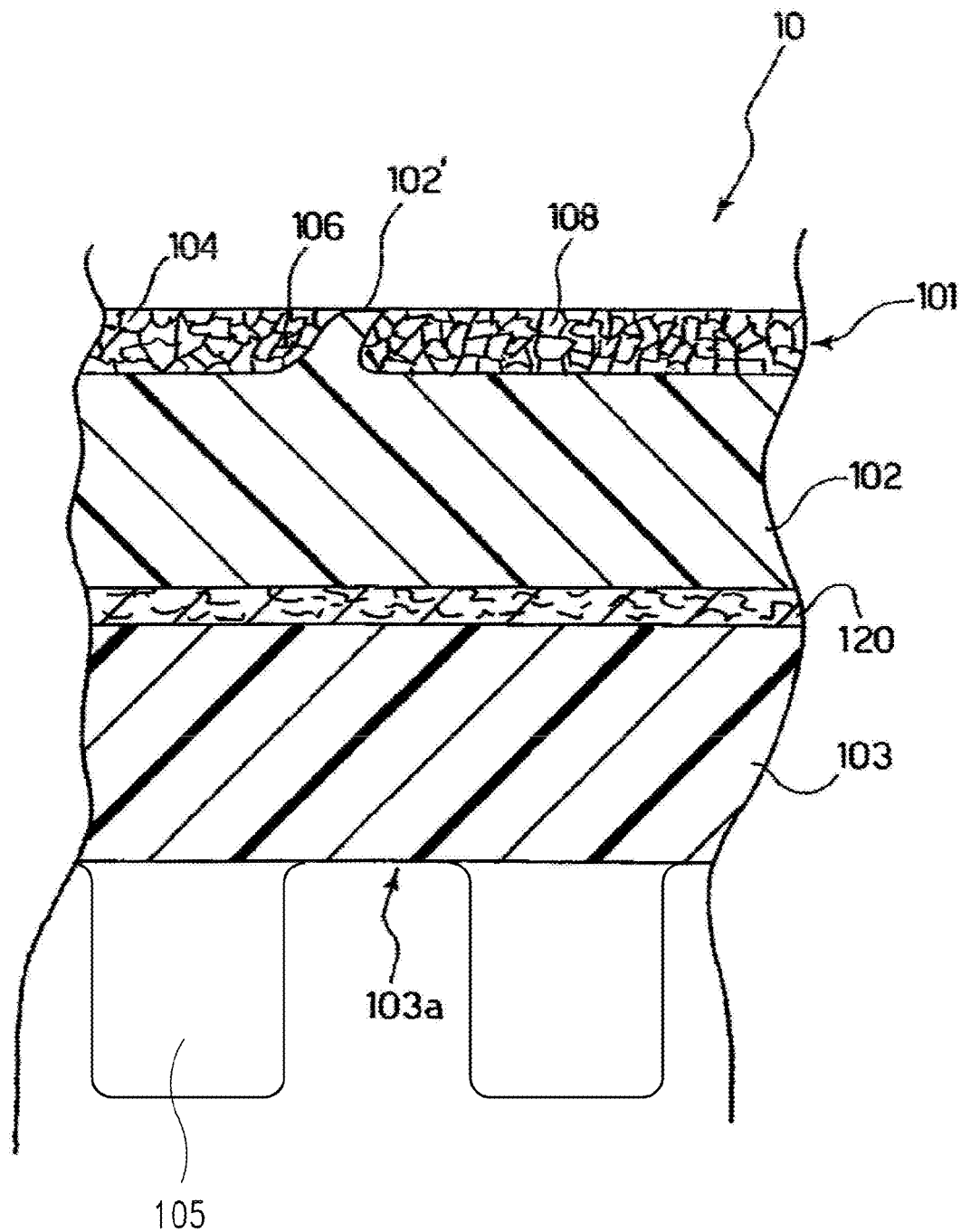
FIG. 3 is a cross section of a covering material according to an alternative embodiment.

For example, the reference number 116 in FIG. 2 indicates as a whole a grinding station, in which the face or outer surface of the bottom layer 103 undergoes grinding or roughening so as to lead to the formation of the surface granularity 103a. It will be appreciated that said operation can be carried out (of course limitedly to the crest parts) also in the case where the outer surface of the layer 103 has received (usually during processing in the station 114) a conformation with ribbings or feet or grooves 105, such as the one schematically represented FIG. 3.

Of course, without prejudice the principle of the invention, the details of fabrication and the embodiments may vary widely with respect to what is described and illustrated herein, without thereby departing from the scope of the present invention.

All of the above U.S. patents, U.S. patent application publications, U.S. patent applications, foreign patents, foreign patent applications and non-patent publications referred to in this specification, are incorporated herein by reference, in their entirety.

The invention claimed is:

1. A layered-structure laminar covering material comprising:
    an outermost layer;
    a bottom layer; and
    an intermediate layer set between said outermost layer and said bottom layer, said outermost layer, intermediate layer and bottom layer each including a matrix constituted by a mixture of polyolefin and a thermoplastic elastomer, said matrix being substantially identical for all three of said outermost layer, intermediate layer, and bottom layer, the matrix of said outermost layer is substantially free of fillers and has a first value of density, said bottom layer contains fillers so as to have a second value of density greater than said first value of density, and said intermediate layer contains fillers so as to have a third value of density between said first value of density of said outermost layer and said second value of density of said bottom layer.

2. The covering material according to claim 1, wherein the matrix of said outermost layer has a density of between 1 g/cm$^3$ and 1.1 g/cm$^3$.

3. The covering material according to claim 1, wherein said intermediate layer has a density of between 1.3 g/cm$^3$ and 1.4 g/cm$^3$.

4. The covering material according to claim 1, wherein said bottom layer has a density greater than 1.6 g/cm$^3$.

5. The covering material according to claim 1, further comprising a stabilization layer located in a position set between any two of said outermost layer, intermediate layer, and bottom layer.

6. The covering material according to claim 5, wherein said stabilization layer is located in a position between said intermediate layer and said bottom layer.

7. The covering material according to claim 5, wherein said stabilization layer is fiber-based.

8. The covering material according to claim 7, wherein said stabilization layer is glass fiber-based or polyester fiber-based.

9. The covering material according to claim 5, wherein said stabilization layer has a mass per unit area in the range of 25-50 g/m$^2$.

10. The covering material according to claim 5, wherein said stabilization layer is incorporated in the polyolefin/thermoplastic-elastomer matrix of the layers between which said stabilization layer is set.

11. The covering material according claim 1, wherein said outermost layer is made starting from granules.

12. The covering material according to claim 11, wherein said outermost layer is made starting from granules of different colorings.

13. The covering material according to claim 11, wherein said intermediate layer has portions that emerge at an outermost surface of said outermost layer.

14. The covering material according to claim 1, characterized in that said polyolefin is selected out of the group consisting of polyethylene, polypropylene and/or mixtures and/or copolymers thereof.

15. The covering material according to claim 14, characterized in that said polyolefin is substantially polyethylene.

16. The covering material according to claim 14, characterized in that said polyolefin is substantially low-density polyethylene.

17. The covering material according to claim 1, wherein said thermoplastic elastomer is selected out of the group consisting of thermoplastic elastomers of styrenic origin, and mixtures thereof.

18. The covering material according to claim 17, wherein said thermoplastic elastomer of styrenic origin is substantially poly(styrene-butadiene-styrene).

19. The covering material according to claim 1, wherein said bottom layer has an outer surface presenting a microgranular appearance.

20. The covering material according to claim 1, wherein said bottom layer has an outer surface presenting groovings in the form of ribbings, feet or similar formations.

21. A multi-layer material comprising:
an outermost layer having a first polyolefin matrix of a first density;
a bottom layer having a second polyolefin matrix of a second density; and
an intermediate layer positioned between the outermost layer and the bottom layer, the intermediate layer having a third polyolefin matrix of a third density, wherein, each of the first, second and third polyolefin matrices include a thermoplastic elastomer dispersed therein, the first density being lower than the third density, the third density being lower than the second density.

22. The multi-layer material of claim 21 wherein the first polyolefin matrix further include a plurality of pigmenting fillers dispersed therein.

23. The multi-layer material of claim 21 wherein the second matrix and the third matrix each further includes a plurality of mineral fillers dispersed therein.

24. The multi-layer material of claim 21 wherein the first density is about 1 g/cm$^3$ to 1.1 g/cm$^3$; the third density is about 1.3 g/cm$^3$ to 1.4 g/cm$^3$; and the second density is about above 1.6 g/cm$^3$.

25. The multi-layer material of claim 21 wherein the polyolefin is polyethylene, polypropylene, blend of polyethylene and polypropylene, or copolymers thereof.

26. The multi-layer material of claim 21 wherein the thermoplastic elastomer is polystyrene or poly(styrene-butadiene-styrene).

27. The multi-layer material of claim 21 further comprising a stabilizing layer.

* * * * *